(No Model.)

E. P. STONE.
HARROW.

No. 368,118. Patented Aug. 9, 1887.

WITNESSES:
Chas. Nida
C. Sedgwick

INVENTOR:
E. P. Stone
BY Munn & Co.
ATTORNEYS.

UNITED STATES PATENT OFFICE.

ELIHU PATON STONE, OF LINCOLN, KANSAS.

HARROW.

SPECIFICATION forming part of Letters Patent No. 368,118, dated August 9, 1887.

Application filed February 23, 1887. Serial No. 228,552. (No model.)

*To all whom it may concern:*

Be it known that I, ELIHU PATON STONE, of Lincoln, in the county of Lincoln and the State of Kansas, have invented a new and Improved Harrow, of which the following is a full, clear, and exact description.

The object of my invention is to provide a new and improved harrow the teeth of which can be raised out of the ground and cleaned.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
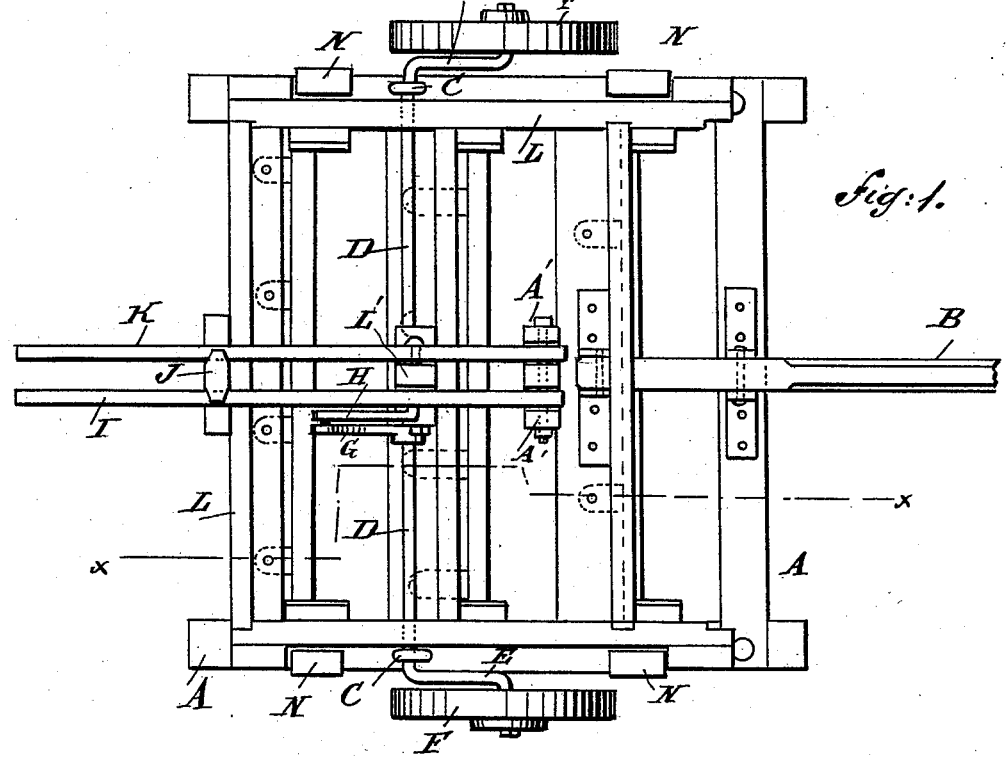
Figure 2:
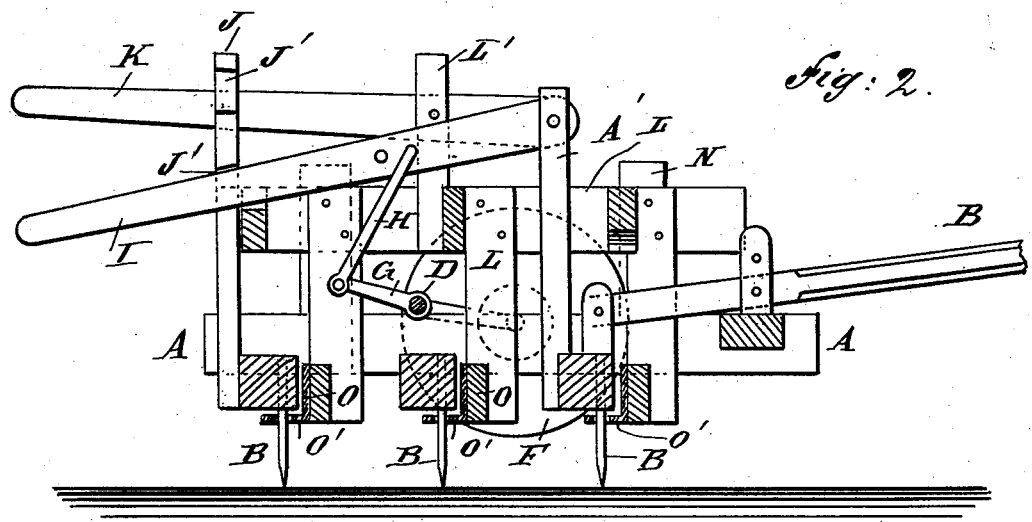
Figure 3:
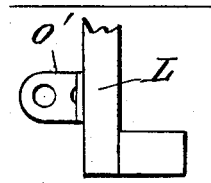

Figure 1 is a plan view of my improvement. Fig. 2 is a longitudinal sectional elevation of the same on the line $x\ x$ of Fig. 1, and Fig. 3 is an under side view of part of the sliding scraper-frame.

The harrow-frame A, of suitable size and shape, is provided on its front with the usual tongue and on its bottom with the fixed harrow-teeth B, and also on its top with the bearings C, in which is mounted transversely the shaft D, carrying on each end a crank-arm, E, supporting at its lower end a wheel, F. The shaft D is also provided in its middle with an arm, G, connected by the link H with the lever I, extending rearward, being fulcrumed on the arm A', erected on the forward part of the frame A. The outer part of the lever I is adapted to engage notches J' formed in the post J, secured to the frame A and serving to lock the said lever I in place.

On the arm A' is also pivoted the rearwardly-extending lever K, on which is pivoted the arm L', secured to the scraping-frame L, adapted to slide vertically in suitable bearings, N, attached to the top of the frame A. The frame L carries the scrapers O, each of which is provided with a plate, O', having a central aperture, through which passes a harrow-tooth B, and for each of the latter a plate O' is provided. The lever K is also locked in position on the notched arm J in a manner similar to that on which the lever I is locked.

The operation is as follows: In the position shown in Fig. 2 the harrow is ready for harrowing the ground. When the harrow-teeth B become blocked up by roots, sticks, grain, &c., then the operator raises the lever I, whereby the wheels F are lowered upon the ground and the harrow-teeth B are drawn a short distance out of the ground. The operator then lowers the lever K, so that the frame L slides downward, and the scraping-blades O' of the scrapers O also pass downward on their respective teeth B and clean the latter of the clogging material. As soon as this is accomplished the operator raises the lever K and throws the lever I downward into the normal position, (shown in Fig. 2,) so that the harrow can be used again in the usual manner.

Having thus fully described my invention, I claim as new and desire to secure by Letters Patent—

1. In a harrow, the combination, with a harrow-frame and its teeth, of a transverse shaft having crank-arms at its ends mounted on the harrow-frame, wheels on the crank-arms, means for turning the said shaft to raise or lower the harrow-frame, a frame sliding in bearings in the said harrow-frame and provided with apertured plates through which the teeth project, and a lever for raising and lowering the sliding frame, substantially as herein shown and described.

2. In a harrow, the combination, with a harrow-frame and its teeth, of a frame sliding in bearings on the harrow-frame and provided with apertured plates through which the teeth project, a transverse shaft having crank-arms at its ends and provided at its middle with an arm, wheels on the crank-arms, a lever pivoted to the harrow-frame, and a link pivoted to the said lever and arm, substantially as herein shown and described.

3. In a harrow, the harrow-frame A, the harrow-teeth B, fixed on the said frame A, the shaft D, mounted on the said harrow-frame, the crank-arms E, secured to the ends of the said shaft D, the wheels F, mounted on the said crank-arms E, the arm G, secured to the said shaft D, the link H, pivotally connected with the said arm G, and the lever I, fulcrumed on a standard on the said frame A and pivotally connected with the said link H, in combination with the sliding frame L, the scrapers O, secured to the said sliding frame L and each provided with a plate, O', through which passes a corresponding harrow-tooth, B, and the lever K, fulcrumed on the harrow-frame A and pivotally connected with the said sliding frame L, substantially as shown and described.

ELIHU PATON STONE.

Witnesses:
SAMUEL GILPIN,
JAS. A. SMITH.